United States Patent
Andrivon et al.

(10) Patent No.: US 11,412,275 B2
(45) Date of Patent: Aug. 9, 2022

(54) METADATA TRANSLATION IN HDR DISTRIBUTION

(71) Applicant: InterDigital VC Holdings, Inc., Wilmington, DE (US)

(72) Inventors: Pierre Andrivon, Liffre (FR); Edouard Francois, Bourg des Comptes (FR); Patrick Perez, Rennes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/255,468

(22) PCT Filed: May 21, 2019

(86) PCT No.: PCT/US2019/033288
§ 371 (c)(1),
(2) Date: Dec. 23, 2020

(87) PCT Pub. No.: WO2020/005414
PCT Pub. Date: Jan. 2, 2020

(65) Prior Publication Data
US 2021/0274226 A1    Sep. 2, 2021

(30) Foreign Application Priority Data

Jun. 26, 2018   (EP) .................................... 18305812

(51) Int. Cl.
*H04N 21/235* (2011.01)
*H04N 9/77* (2006.01)
(Continued)

(52) U.S. Cl.
CPC .......... *H04N 21/2353* (2013.01); *H04N 9/77* (2013.01); *H04N 21/23614* (2013.01); *H04N 21/234327* (2013.01)

(58) Field of Classification Search
CPC ....... H04N 21/2353; H04N 21/234327; H04N 21/23614; H04N 9/77
(Continued)

(56) References Cited

U.S. PATENT DOCUMENTS 10,200,701 B2 *  2/2019  Bugdayci Sansli .. H04N 19/184
10,291,874 B2 *  5/2019  Toma ....................... H04N 9/68
(Continued)

FOREIGN PATENT DOCUMENTS

EP           3163890 A1    5/2017
RU        2016105434 A    8/2017
(Continued)

OTHER PUBLICATIONS

Diaz et al., "integrating HEVC Video Compression with a High Dynamic Range Video Pipeline", SMPTE Motion Imaging Journal, vol. 125, No. 1, Jan./Feb. 2016, pp. 14-21.
(Continued)

*Primary Examiner* — Nnenna N Ekpo
(74) *Attorney, Agent, or Firm* — Condo Roccia Koptiw LLP

(57) ABSTRACT

A method provides translation of metadata related to enhancement of a video signal according to a first high dynamic range video distribution type into metadata related to enhancement of a video signal according to a second high dynamic range video distribution type. Translation is done between a value of a first metadata set corresponding to a first type of high dynamic range video and a value of a second metadata set corresponding to a second type of high dynamic range video and uses an association that may be stored in a lookup table that is determined according to differences between a test image reconstructed using the metadata of first type and the same image reconstructed using the metadata of second type. A receiver apparatus and
(Continued)

a transmitter apparatus comprising the translation method are also disclosed.

18 Claims, 8 Drawing Sheets

(51) Int. Cl.
    *H04N 21/2343*      (2011.01)
    *H04N 21/236*      (2011.01)

(58) Field of Classification Search
    USPC .......................................................... 725/91
    See application file for complete search history.

(56) References Cited

U.S. PATENT DOCUMENTS

| | | | | |
|---|---|---|---|---|
| 2016/0343348 | A1* | 11/2016 | Oh | H04N 19/46 |
| 2017/0085878 | A1 | 3/2017 | Sole Rojals et al. | |
| 2017/0366791 | A1* | 12/2017 | Andrivon | H04N 1/6058 |
| 2017/0374313 | A1 | 12/2017 | Oh et al. | |
| 2018/0124368 | A1 | 5/2018 | Liu et al. | |
| 2018/0242006 | A1* | 8/2018 | Kerofsky | H04N 19/186 |
| 2018/0336645 | A1* | 11/2018 | Price | G06Q 30/02 |
| 2019/0238816 | A1* | 8/2019 | Sun | G06T 5/007 |

FOREIGN PATENT DOCUMENTS

| | | |
|---|---|---|
| WO | WO 2015007910 A1 | 1/2015 |
| WO | WO 2017019818 A1 | 2/2017 |

OTHER PUBLICATIONS

Anonymous, "High-Performance Single Layer Directly Standard Dynamic Range (SDR) Compatible High Dynamic Range (HDR) System for use in Consumer Electronics devices (SL-HDR1)", European Telecommunications Standards Institute (ETSI), Technical Specification ETSI TS 103 433 V1.1.1, Aug. 2016. 84 pages.

Anonymous, "Dynamic Metadata for Color Volume Transform—Core Components", The Society of Motion Picture and Television Engineers (SMPTE), SMPTE ST 2094-1:2016, May 18, 2018, 15 pages.

Anonymous, "High Efficiency Video Coding", Series H: Audiovisual and Multimedia Systems, Infrastructure of Audiovisual Services—Coding of Moving Video, international Telecommunication Union (ITU), Recommendation ITU-T H.265, Feb. 2018, 692 pages.

Francois et al., "A Single-Layer HDR Video Coding Framework with SDR Compatibility", SMPTE Motion Imaging Journal. Apr. 2017, pp. 16-22.

Anonymous, "High Dynamic Range Electro-Optical Transfer Function of Mastering Reference Displays", Society of Motion Picture and Television Engineers, SMPTE ST 2084:2014. Aug. 16, 2014, 14 pages.

Anonymous, "High-Performance Single Layer High Dynamic Range (HDR) System for use in Consumer Electronics Devices; Part 2: Enhancements for Perceptual Quantization (PQ) transfer function based High Dynamic Range (HDR) Systems (SL-HDR2)", European Telecommunications Standards Institute (ETSI), Technical Specification ETSI TS 103 433-2 V1.1.1, Jan. 2018, 45 pages.

Lasserre et al, "Single-layer HDR video coding with SDR backward compatibility". SPIE Digital Library, Applications of Digital Image Processing XXXIX, Proceedings of the SPIE, vol. 9971, Sep. 27, 2016, 13 pages.

Anonymous, "Dynamic Metadata for Color Volume Transform—Application #1", The Society of Motion Picture and Television Engineers (SMPTE), SMPTE Standard 2094-10:2016, May 18, 2018, 15 pages.

Anonymous, "CCM Compound Content Management Specification", European Telecommunications Standards institute (ETSI), Technical Specification Draft ETSI GS CCM 001 V0.1.1, Jul. 2016, 38 pages.

"Users of CTA-861, A DTV Profile for Uncompressed High-Speed Digital Interfaces", Consumer Technology Association, CTA-861-G, CTA Technology & Standards Department, Nov. 2, 2017, 218 pages.

European Telecommunications Standards Institute (ETSI), TS 103 433-1 V1.2.1, "High-Performance Single Layer High Dynamic Range (HDR) System for Use in Consumer Electronics Devices, Part 1: Directly Standard Dynamic Range (SDR) Compatible HDR System (SL-HDR1)", Aug. 2017, pp. 1-123.

European Telecommunication Standards Institute (ETSI), TS 103 572 V1.1.2, "HDR Signalling and Carriage of Dynamic Metadata for Colour Volume Transform, Application #1 for DVB Compliant Systems", Jul. 2018, pp. 1-16.

Morrison, "What is Advanced HDR by Technicolor?", Jun. 9, 2018, Retrieved from the internet on Jun. 21, 2019: https://www.cnet.com/news/what-is-advanced-hdr-by-technicolor/, 4 pages.

* cited by examiner

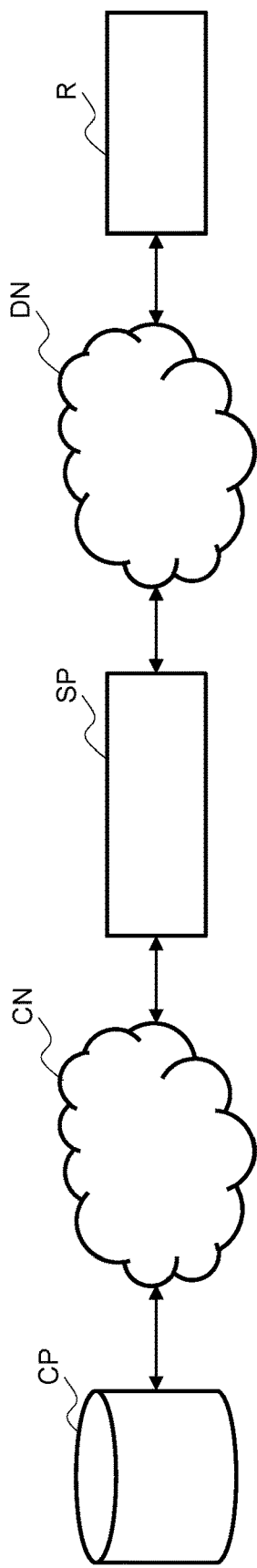
Figure 1A (*Prior art*)
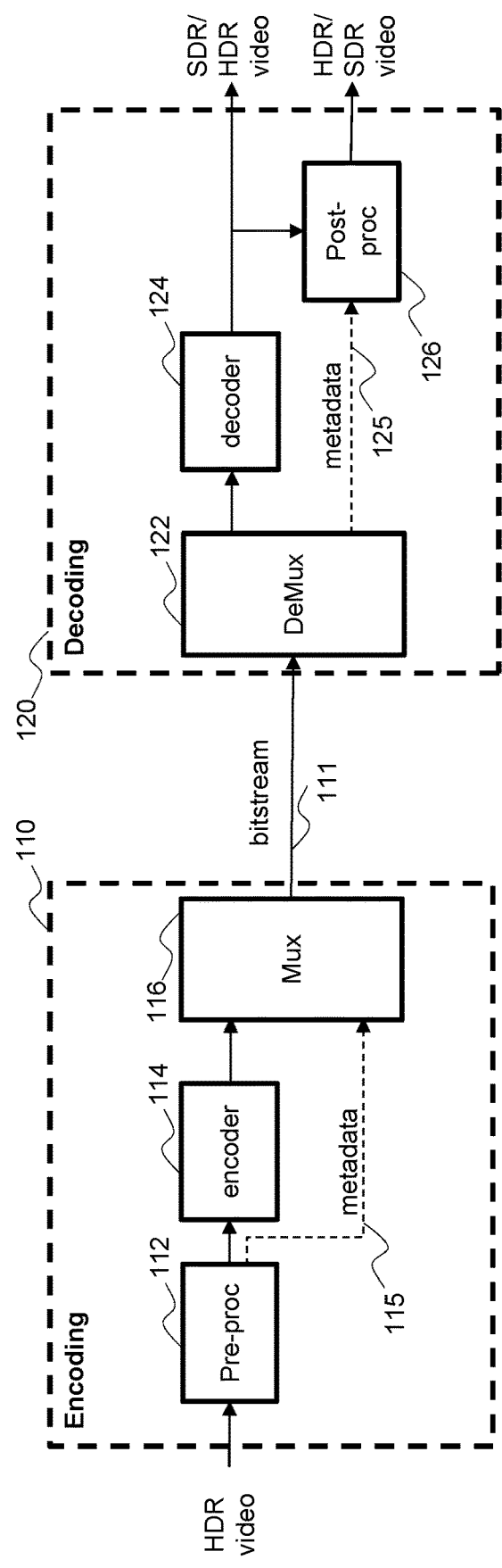
Figure 1B (*Prior art*)

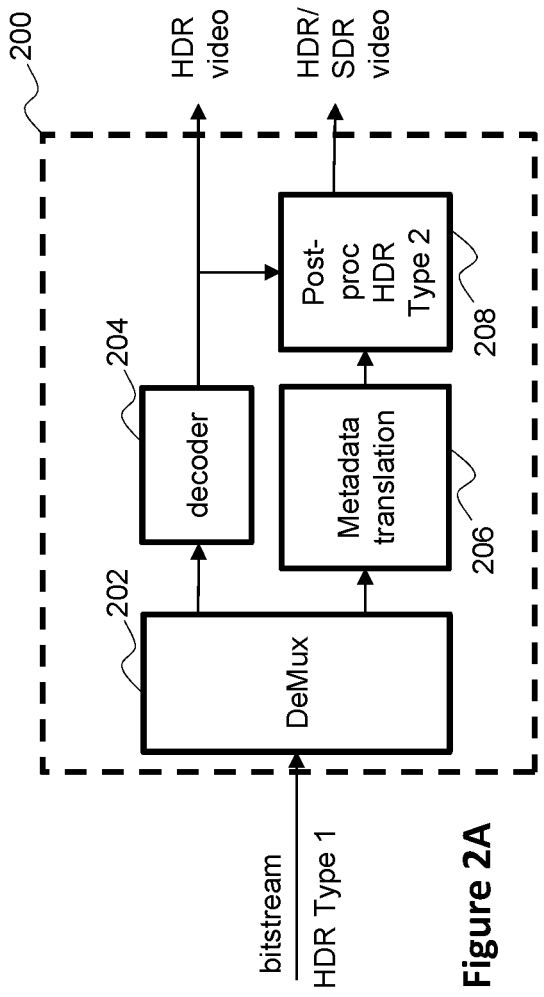
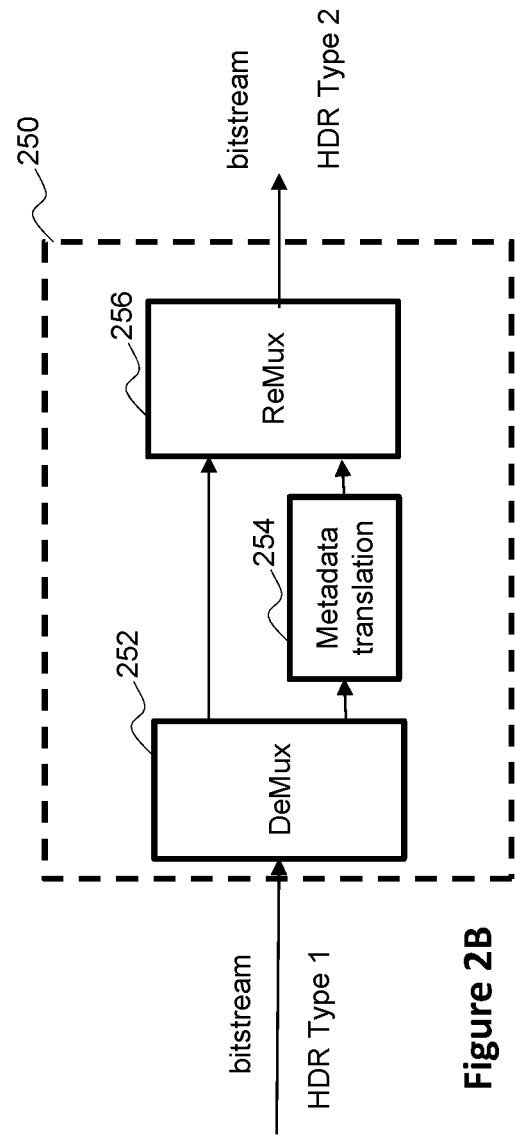
Figure 2A
Figure 2B

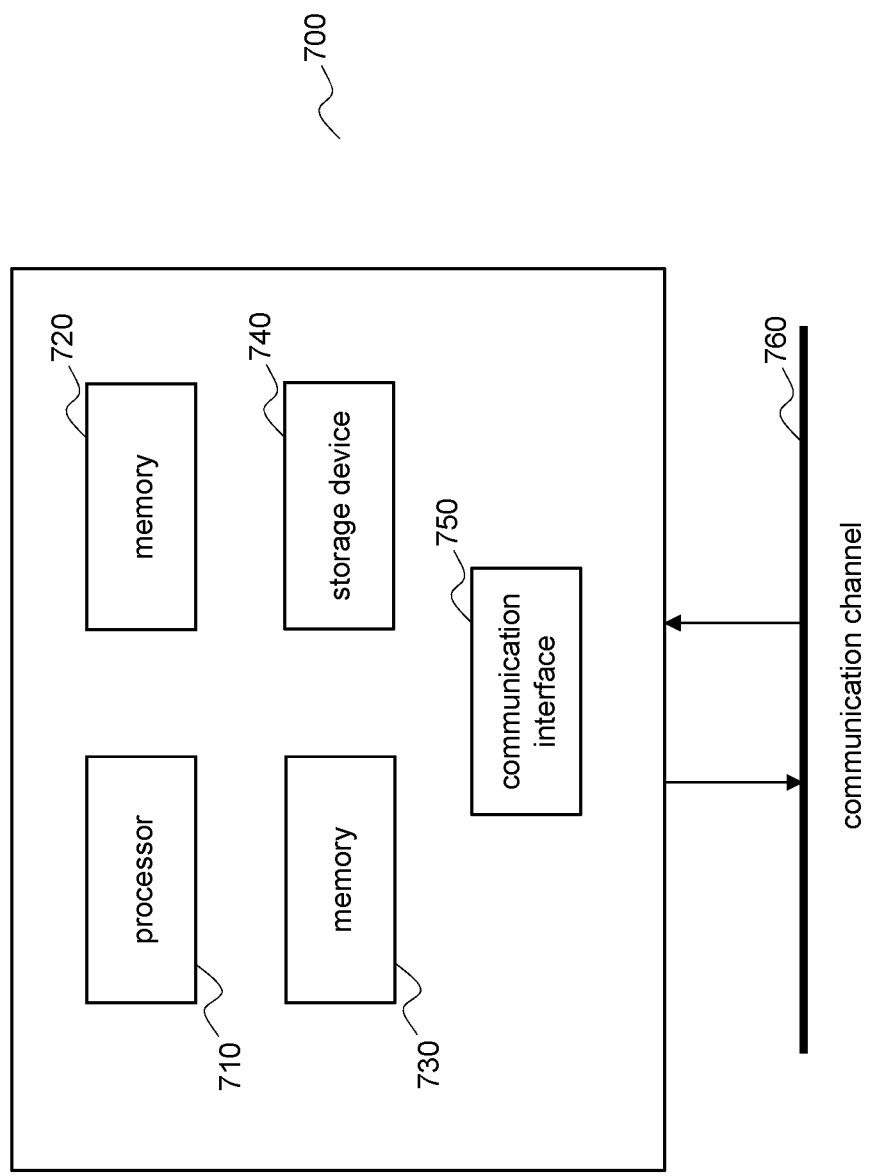

METADATA TRANSLATION IN HDR DISTRIBUTION

CROSS REFERENCE TO RELATED APPLICATIONS

This application is the national stage entry under 35 U.S.C. § 371 of International Application PCT/US2019/033288, filed May 21, 2019 which was published in accordance with PCT Article 21(2) on Jan. 2, 2020, in English, and which claims the benefit of European Patent Application No. 18305812.2, filed Jun. 26, 2018.

TECHNICAL FIELD

One or more of the present embodiments relate to the distribution of high dynamic range (HDR) images or videos. At least one embodiment allows to translate metadata of a first type of HDR distribution to metadata of a second type of HDR distribution.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The plurality of competing HDR distribution technologies do not use the same type of metadata to reconstruct the image. Such incompatibility has fragmented the market and became a bottleneck for vast adoption of HDR since it impacts all actors of the HDR distribution. Currently, a given video may be provided by the producer in a first HDR technology while the consumer receiver only implements a second HDR technology, and therefore requires some conversion from one technology to another. Interoperability mechanisms would help to simplify the distribution and thus to improve the adoption rate of this technology.

It can therefore be appreciated that there is a need for a solution for distributing HDR images or videos that addresses at least some of the problems of the prior art. The disclosed principles have been designed with the foregoing in mind.

The disclosure discusses metadata according to different types of HDR distribution technologies. In order to simplify the description, the wording "first type of HDR distribution technology" is sometimes shortened to "first type".

SUMMARY

In a first aspect, the disclosure is directed to a method for translating metadata related to high dynamic range video, the method comprising obtaining a value of a first metadata set corresponding to a first type of high dynamic range video; and translating (324) the value of the first metadata set into a value of a second metadata set corresponding to a second type of high dynamic range video using an association between one or more metadata values for the first type of high dynamic range video and one or more metadata values for the second type of high dynamic range video.

In a second aspect, the disclosure is directed to a receiver apparatus comprising means for obtaining a bitstream comprising a high dynamic range video of a first type of high dynamic range video and a metadata set according to the first type, means for rendering high dynamic range video of second type, means for parsing metadata of first type, and means for translating metadata of first type into metadata of second type according at least the first aspect.

In a third aspect, the disclosure is directed to a transmitter apparatus comprising means for obtaining a bitstream comprising a high dynamic range video of a first type, means for parsing metadata of first type, means for translating (254) metadata of first type into metadata of second type according to first aspect, —means for replacing the metadata of first type in the bitstream by the translated metadata of second type and means to provide the high dynamic range video of second type.

In a fourth aspect, the disclosure is directed to a computer program comprising program code instructions executable by a processor for implementing any embodiment of the method of the first aspect.

In a fifth aspect, the disclosure is directed to a computer program product which is stored on a non-transitory computer readable medium and comprises program code instructions executable by a processor for implementing any embodiment of the method of the first aspect.

BRIEF DESCRIPTION OF DRAWINGS

Preferred features of the present disclosure will now be described, by way of non-limiting example, with reference to the accompanying drawings, in which:

FIG. 1A illustrates an example of system for HDR video distribution, as known in the prior art, FIG. 1B illustrates an example of encoding and decoding functions implemented in apparatuses of an HDR video distribution system using a single-layer mechanism, as known in the prior art, FIG. 2A shows an example of embodiment implemented in a receiver apparatus comprising a metadata translation function in accordance with an embodiment of the present principles, FIG. 2B shows an example of embodiment implemented in a transmitter apparatus comprising a metadata translation function in accordance with an embodiment of the present principles, FIG. 7 illustrates a block diagram of an exemplary system 700 in which various aspects of the exemplary embodiments may be implemented.

DESCRIPTION OF EMBODIMENTS

Figure 3A:
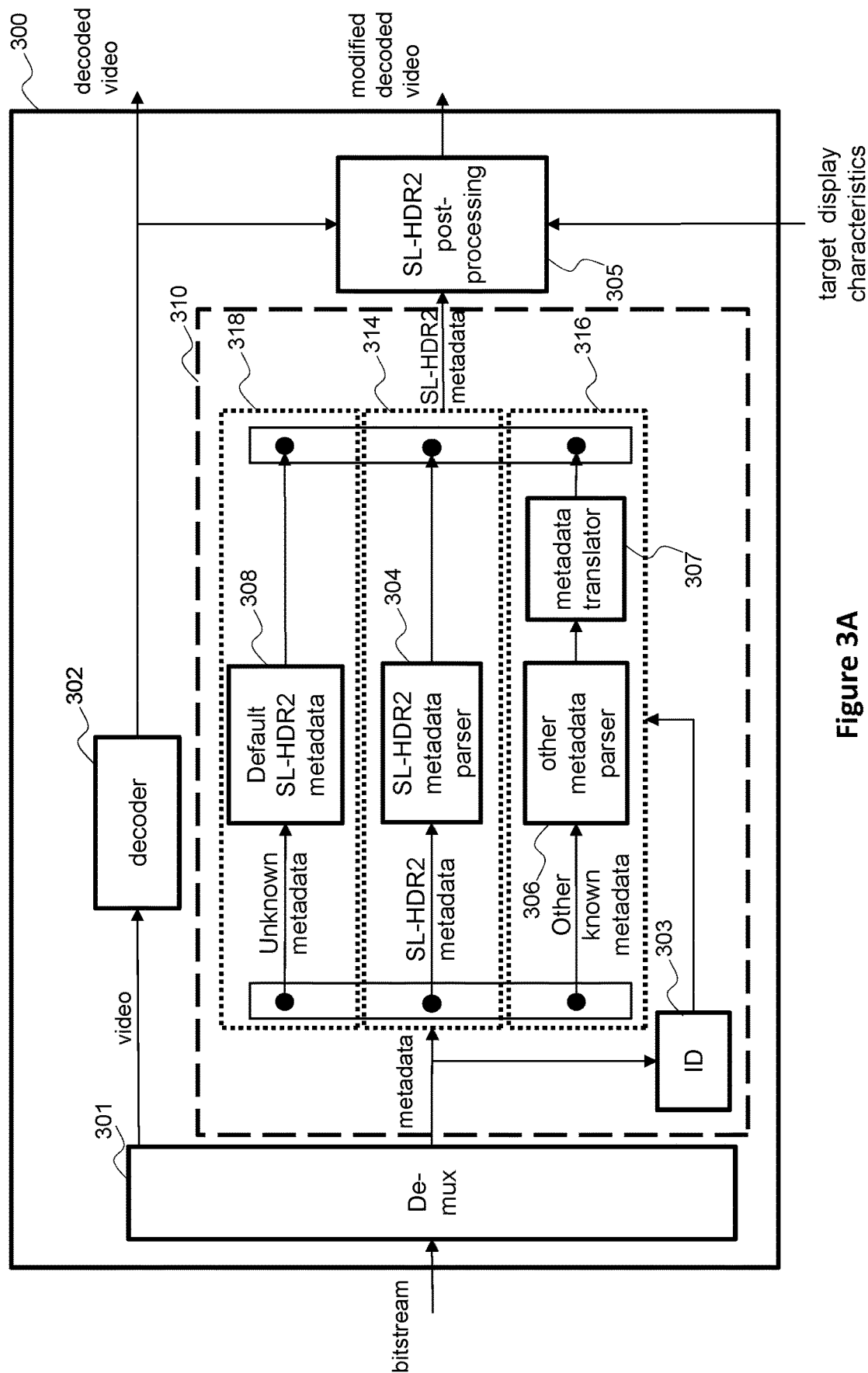
FIG. 3A shows an example of embodiment implemented in a SL-HDR2 receiver apparatus comprising a metadata translation function in accordance with an embodiment of the present principles.

Distribution of digital home video content from content producers to consumers is well known. It conventionally relies on service providers that aggregate contents from different producers with a so-called contribution network and transmit selected content to the consumer's receiver apparatus through a distribution network. Content is either selected by the consumer (video on demand) and streamed to his receiver apparatus or aggregated into channels that are transmitted to a plurality of receiver apparatuses through broadcast or streaming techniques, the selection being done by the user who chooses one channel. In this context, a receiver apparatus performs decoding and rendering functions.

In addition, HDR technology has been developed to enhance the conventional picture quality by increasing the dynamic range of the image or video. However, a plurality of competing HDR distribution technologies emerged and the corresponding receiver apparatuses have been developed and are proposed to consumers. On the production side, content producers are willing to provide their content to the consumer and thus started converting their existing catalogue of content to HDR to benefit from increased quality. Examples of HDR distribution technologies include Dolby Vision as specified in ETSI GS CCM 001 (hereafter abbreviated DV), Samsung HDR10+ as specified in SMPTE ST 2094-40 (hereafter abbreviated HDR10+), Technicolor-Philips single layer HDR as specified in ETSI TS 103 433-2 (hereafter named SL-HDR2). These HDR distribution technologies are based on an encoded video signal providing a first dynamic range and associated metadata, being dynamic and possibly completed with static ones (the metadata being related to the content of the frame or the scene), the metadata being used to reconstruct an enhanced signal for example of higher or lower dynamic range fitting target display characteristics in terms of luminance range. This feature is known as display adaptation.

The disclosed principles are related to a method and apparatuses for translating metadata related to enhancement of a video signal according to a first high dynamic range video distribution type into metadata related to enhancement of a video signal according to a second high dynamic range video distribution type. Translation is done using a lookup table being determined according to differences between a test image reconstructed using the metadata of first type and the same image reconstructed using the metadata of second type.

FIG. 1A illustrates an example of system for HDR video distribution, as known in the prior art. In such environment, the plurality of HDR videos from one content producer CP is provided through a contribution network CN to a service provider and is distributed through a distribution network DN to a receiver R that displays a selected content. Obviously, a real system comprises a plurality of content producers CP, a plurality of service providers SP and a plurality of receivers. Thus, different HDR technologies may coexist in such a system and incompatibility issues could arise. For example, a service provider using a first HDR technology (e.g. HDR10+) for the distribution network may receive the content using a second HDR technology (e.g. SL-HDR2) from the content provider, or a receiver integrating a second HDR technology (e.g. SL-HDR2) receives content using a third HDR technology (e.g. DV).

FIG. 1B illustrates an example of encoding and decoding functions implemented in apparatuses of an HDR video distribution system using a single-layer mechanism, as known in the prior art. The encoding function 110 is for example implemented in a server apparatus, a transmitter apparatus, a transcoder apparatus, etc. The decoding function 120 is for example implemented in a receiver apparatus such as a television, an optical media player, a computer, etc. The description hereafter uses the generic terms transmitter and receiver for the apparatuses respectively comprising an encoding function 110 and a decoding function 120, and other functions of the apparatuses are not represented in this illustration. The transmitter apparatus obtains the HDR video content, pre-processes 112 it to extract metadata 115 and to transform the video to a reduced dynamic range video, encodes 114 the transformed video and multiplexes 116 the encoded video with the metadata 115 to generate a bitstream 111 representing the content. The receiver apparatus obtains the bitstream 111, demultiplexes 122 it to extract the metadata 125 and the encoded video, decodes 124 the video to generate a first video and post-processes 126 this first video with the extracted metadata 125 to generate an enhanced video (e.g. of lower dynamic range than the decoded first video). As mentioned above, multiple competing systems exist, resulting in a plurality of types of metadata, a plurality of pre-processing functions and a plurality of post-processing functions, so that a receiver apparatus implementing only one type of HDR distribution cannot render enhanced HDR content using another type of HDR distribution.

Encoding and decoding are for example performed according to High Efficiency Video Coding (HEVC) standard (ITU-T H.265 Telecommunication standardization sector of ITU (February 2018), series H: audiovisual and multimedia systems, infrastructure of audiovisual services—coding of moving video, High efficiency video coding, Recommendation ITU-T H.265) in combination with SMPTE ST 2084:2014, "High Dynamic Range Electro-Optical Transfer Function of Mastering Reference Displays", or Diaz, R., Blinstein, S. and Qu, S. "Integrating HEVC Video Compression with a High Dynamic Range Video Pipeline", SMPTE Motion Imaging Journal, Vol. 125, Issue 1. February 2016, pp 14-21. Other video coding standards may be used and be compatible with the disclosed principles.

FIG. 2A shows an example of embodiment implemented in a receiver apparatus comprising a metadata translation function in accordance with an embodiment of the present principles. Using the metadata translation function 206, a receiver apparatus 200 that comprises a post-processing function 208 designed to handle metadata of a second type is able to handle content comprising metadata of a first type. Indeed, the receiver apparatus 200 obtains a bitstream comprising an HDR video of a first type, demultiplexes 202 the bitstream to extract at least the encoded video signal and the metadata of first type, decodes 204 the video, translates 206 the metadata of first type into metadata of a second type and post-processes 208 the video according to the translated metadata to generate an HDR video of second type. When such a receiver apparatus also integrates a display (e.g. television, computer, tablet), the HDR video of second type is also rendered on the screen. The input bitstream can be received from another apparatus but also obtained locally, for example by reading data from a memory or local storage.

The same FIG. 2A can also be used to describe the corresponding method for reception of a bitstream comprising an HDR video of a first type on an apparatus designed to render a bitstream comprising an HDR video of a second type. The method comprises obtaining a bitstream comprising an HDR video of a first type, demultiplexing the bitstream to extract at least the encoded video signal and the metadata of first type, decoding the video, translating the metadata of first type into metadata of a second type and post-processing the video according the translated metadata to generate an HDR video of second type.

FIG. 2B shows an example of embodiment implemented in a transmitter apparatus comprising a metadata translation function in accordance with an embodiment of the present principles. Thanks to the metadata translation function 254, a transmitter apparatus 250 is able to transform an incoming bitstream comprising an HDR video of a first type into a bitstream comprising an HDR video of a second type without having to decode the video. This solution is much more efficient than the straightforward approach that would consist in performing the full decoding of the bitstream of a first type to generate an intermediate HDR video and then convert it according to a second type. The main problem of such a straightforward approach solution is its computational complexity. Besides it requires that an intermediate or end apparatus contains both a post-processor of first type, a pre-processor and a post-processor of second type. However, the pre-processing step is not designed to be running real-time in a receiver. It is therefore not realistic to apply this complete process in a receiver or decoder apparatus, at least not in an apparatus with reasonable cost and performance.

With the proposed embodiment, the transmitter apparatus 250 simply demultiplexes 252 the bitstream to extract the metadata of a first type, translates 254 these metadata according to a second type and re-multiplexes 256 them with the other data of the bitstream. Such an apparatus is typically used in the contribution network and distribution network when the type of HDR distribution technology of the content received is not the same as the one to be transmitted.

The transmitter apparatus 250 can also more generally be a converter apparatus or a provider apparatus, in other words, not necessarily transmitting the bitstream resulting of the translation operation to another apparatus. Such a provider apparatus can for example package the bitstream as a file or set of files to be stored on memory (e.g.: Read-only memory, flash memory, USB key, hard disk drive, solid-state drive, cloud storage, etc.) or on other supports such optical media (DVD and Blu-ray discs). In the latter case, the providing apparatus can for example be a DVD or Blu-ray burner or a DVD or Blu-ray replication system.

The same FIG. 2B can also be used to describe the corresponding method for providing a bitstream comprising an HDR video of a second type on an apparatus obtaining a bitstream comprising an HDR video of a first type. The method comprises obtaining a bitstream comprising an HDR video of a first type, demultiplexing the bitstream to extract the metadata of a first type, translating these metadata according to a second type, re-multiplexing the translated metadata with the other data of the bitstream and providing the re-multiplexed bitstream, thus conforming to the second type of HDR video.

FIG. 3A shows an example of embodiment implemented in a SL-HDR2 receiver apparatus comprising a metadata translation function in accordance with an embodiment of the present principles. The receiver 300 is natively designed to use the SL-HDR2 HDR technology and thus, it integrates a SL-HDR2 post-processing function 305 to generate the enhanced HDR video. In order to generate an HDR video from a bitstream using another HDR technology, the receiver comprises a metadata translation function 310.

In the context of the embodiments of the disclosure, metadata translation from a first type to a second type corresponds to translating a first set of metadata values of a first type to a second set of metadata values of a second type. Indeed, it is not a simple value of one parameter that is translated but multiple values for multiple parameters of the metadata, thus the wording "metadata set" or "set of metadata values" used herein to express the multiple values of the multiple parameters of the metadata.

In this embodiment, the receiver apparatus 300 obtains a bitstream comprising an HDR video of a first type, demultiplexes 301 the bitstream to extract at least the encoded video signal and the metadata of first type. The receiver apparatus analyses the metadata to identify 303 the type of metadata, representative of the type of HDR technology used. The metadata type identification is performed through the analysis of the payload type of the metadata. For example, in the case the metadata are carried over supplemental enhancement information (SEI) messages of HEVC, a payloadType allows to identify the type of metadata. The payloadType value identifies the type of SEI message; providing information either straightforwardly on the technology to be used to interpret the technology (e.g. payloadType equal to 142 identifies Colour Remapping Information (CRI) SEI message, it is expected that a post-processor designed for CRI is employed) or less directly, typically when the payloadType value is equal to 4, specifying a user data registered by ITU-T T.35 SEI message. In that latter case, the parsing of the three first syntax elements (itu_t35_country_code, terminal_provider_code, terminal_provider_oriented_code_message_idc) enables the identification of the SEI message and the technology associated. As an example, SL-HDR2 is uniquely determined by the following values for these syntax elements: 0xB5 (itu_t35_country_code), 0x00, 0x3A (terminal_provider_code) and 0x00 (terminal_provider_oriented_code_message_idc). Those values are specified in ETSI TS 103 433-2 for SL-HDR2. As another example, Dolby Vision metadata are identified as follows: 0xB5 (itu_t35_country_code), 0x00, 0x3B (terminal_provider_code) and 0x00 (terminal_provider_oriented_code_message_idc). Those values are specified in ETSI TS 103 572. Terminal provider codes (terminal_provider_code) are uniquely allocated by a national organism (identified by itu_t35_country_code) registered by the Telecommunication Standardization Bureau (TSB) of ITU. Each terminal provider can allocate a unique SEI message identified by the terminal_provider_oriented_code_message_idc. Standards implementing HDR dynamic metadata refers to specifications defining the values of these syntax elements to allows determination of the technology (post-processor) to be employed for interpreting and applying HDR metadata.

Depending on the identified type of metadata, three situations may occur:

Block 314: If the identified metadata type is related to SL-HDR2, the SL-HDR2 metadata parser (that extracts metadata from the bitstream) applies 304 and no translation is needed; this is the normal path for a SL-HDR2 decoder receiving a SL-HDR2 video (i.e. HDR video with SL-HDR2 metadata), Block 316: If the identified metadata type corresponds to a known metadata format different from SL-HDR2, the metadata parser 306 applies to this alternate format (e.g. DV metadata parser) and the metadata set is translated 307 into a SL-HDR2 metadata set, Block 318: If the identified metadata type does not correspond to a metadata format known by the translation function 310, different options are possible. In a first embodiment, the SL-HDR2 decoder simply discards the identified metadata and conventionally decodes the associated coded stream, thus generating a video whose quality is lower than if it would have used the metadata with the appropriate post-processing. In another embodiment, default SL-HDR2 metadata set 308 that are pre-defined and stored in the SL-HDR2 decoder are used (e.g. such as specified in annex F of ETSI TS 103 433-2). This second option is the one illustrated in FIG. 3A.

In any of the preceding cases, the metadata are SL-HDR2 metadata, either natively (314), or by translation (316), or by loading default predetermined values (318), and thus can be used by the SL-HDR2 post-processing module 305 to render the adjusted video. Such a receiver apparatus is efficient since it does not perform any transcoding and reuse existing module 305. The translation module may be implemented as a firmware update in system on chips already deployed and implementing SL-HDR2 post-processor.

Although FIG. 3A illustrates a receiver apparatus, the person skilled in the art understands that the principle applies also to the transmitter apparatus of FIG. 2B in the case where the second type of metadata is SL-HDR2. Thus, the block 254 of FIG. 2B can simply be replaced by the block 310 of FIG. 3A.

Figure 3B:
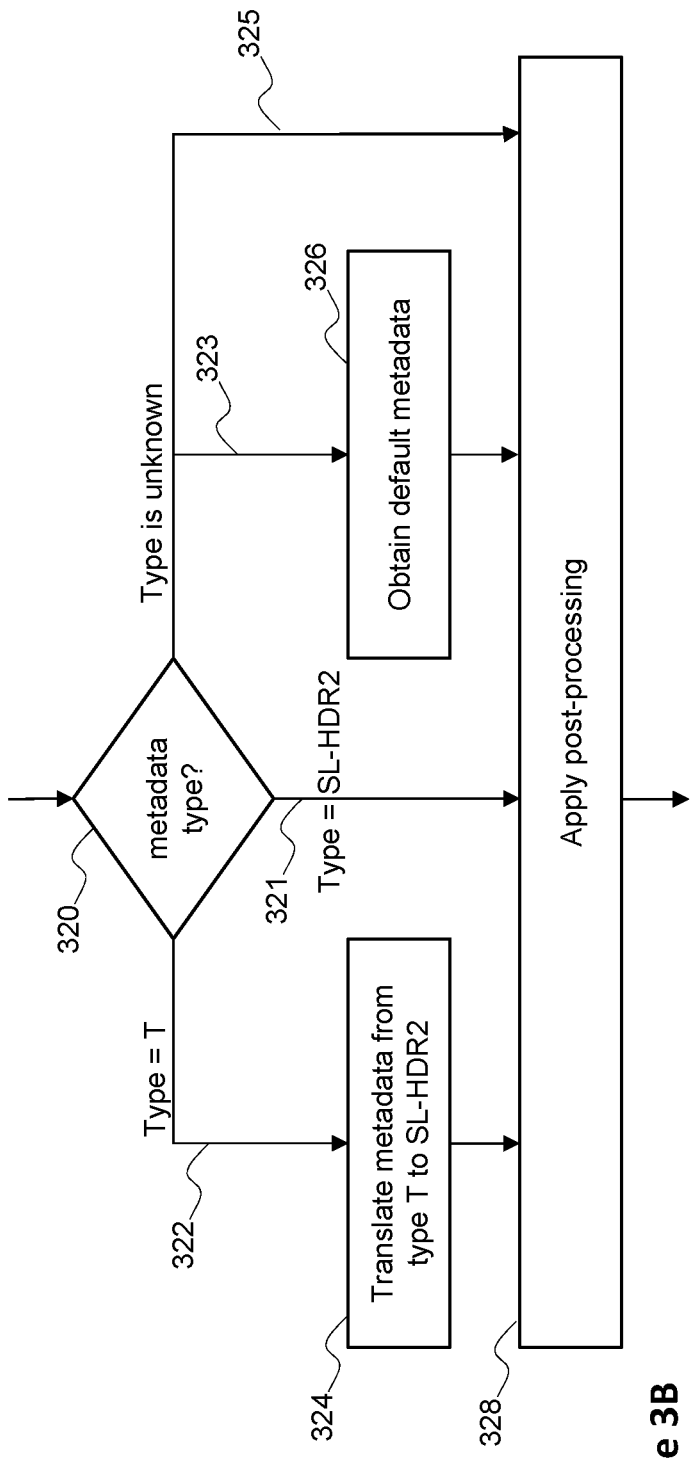
FIG. 3B shows an example of flowchart of the three situations of the metadata test in an example of embodiment implemented in a SL-HDR2 receiver apparatus comprising a metadata translation function in accordance with an embodiment of the present principles.

FIG. 3B shows an example of flowchart of the three situations of the metadata test in an example of embodiment implemented in a SL-HDR2 receiver apparatus comprising a metadata translation function, in accordance with an embodiment of the present principles. In step 320, the obtained metadata type is tested. When the metadata corresponds to SL-HDR2, in branch 321, normal operation of a SL-HDR2 receiver is performed and thus the post-processing 328 is applied with the obtained metadata to generate the video. In branch 322, when the metadata is not SL-HDR2 but corresponds to a known type of metadata (i.e. one for which a LUT is available), the metadata set of known type is translated 324 into a SL-HDR2 metadata set and then used for post-processing 328 to generate the video. In branch 323, when the metadata is unknown (i.e. either not the native type or no metadata translation LUT is available), a default set of SL-HDR2 metadata set is obtained and then used for post-processing 328 to generate the video. In a first embodiment corresponding to branch 325, no post processing is performed, and the decoded video is generated without any enhancement. In a second embodiment, default metadata set is provided by a remote apparatus under request of the receiver.

The steps 320, 324, 326 of the method for translating metadata set from a first type to a second type can be implemented by the apparatuses 200 of FIG. 2A, 250 of FIG. 2B, 300 of FIG. 3A previously described in this disclosure. Similarly, the metadata set translation structural blocks 206 of FIG. 2A, 254 of FIG. 2B and 310 of FIG. 3A can implement the method of FIG. 3B to perform the metadata set translation from a first type to a second type.

Figure 3C:
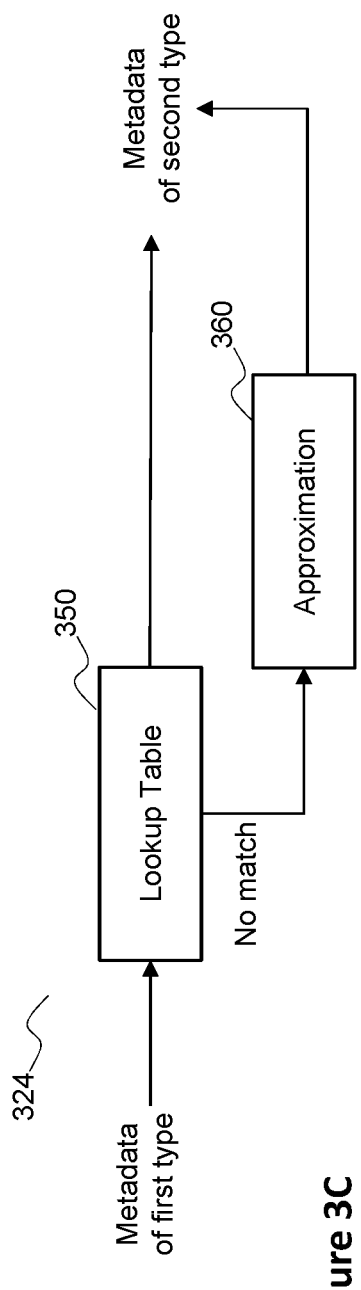
FIG. 3C shows an example of flowchart of a metadata translation function in accordance with an embodiment of the present principles.

FIG. 3C shows an example of flowchart of a metadata set translation function in accordance with an embodiment of the present principles. The metadata set translation function 324 (307 in FIG. 3A, 324 in FIGS. 3B and 3C) is needed since different HDR distribution technologies use different metadata. More exactly, the number of elements of the metadata is different, the type of elements of the metadata is different and the impact of each element of the metadata on the associated post-processing is also different.

In the proposed approach, the metadata translation is a multidimensional look-up table 350 (LUT) that translates directly a metadata set of first type to a metadata set of second type, the size of the sets of metadata being possibly different. With such a solution, the values of the metadata set of first type is given as an input value of the LUT 350 that provides values for the metadata set of second type as a result. The LUT is built to minimize the differences between images reconstructed using the metadata of first type and images reconstructed using the corresponding value of metadata of second type. The mechanism to build this LUT is described further below in two different embodiments.

When the input does not exactly match one entry of the LUT, some approximation 360 need to be done to translate the metadata set of a first type into a metadata set of second type. Different embodiments cover different ways of handling this situation.

In an embodiment, the closest input, according to a computation of distances (e.g. Euclidean norm) between the metadata set to translate and the values of the entries of the LUT, is selected and the corresponding output of this closest input is returned as result.

In another embodiment, when the metadata set to translate is in-between the values of two entries, an interpolation may be computed. This interpolation is determined with regards to the entries of the LUT and applied to the output so that the output is interpolated similarly as the input. Interpolation may be linear, polynomial, spline-based, etc.

In another embodiment, when the value of the metadata to translate is too far away from any entry of the LUT, then a set of default metadata values is provided for the output (similar to those which could be used in a recovery case or to an unknown type of metadata).

Multiple LUTs are used in the case multiple translations need to be performed. For example, a SL-HDR2 receiver that includes both a DV to SL-HDR2 LUT and an HDR10+ to SL-HDR2 LUT is able to cope with videos of both types. The next sections describe two different methods for building such LUTs.

Figure 4:
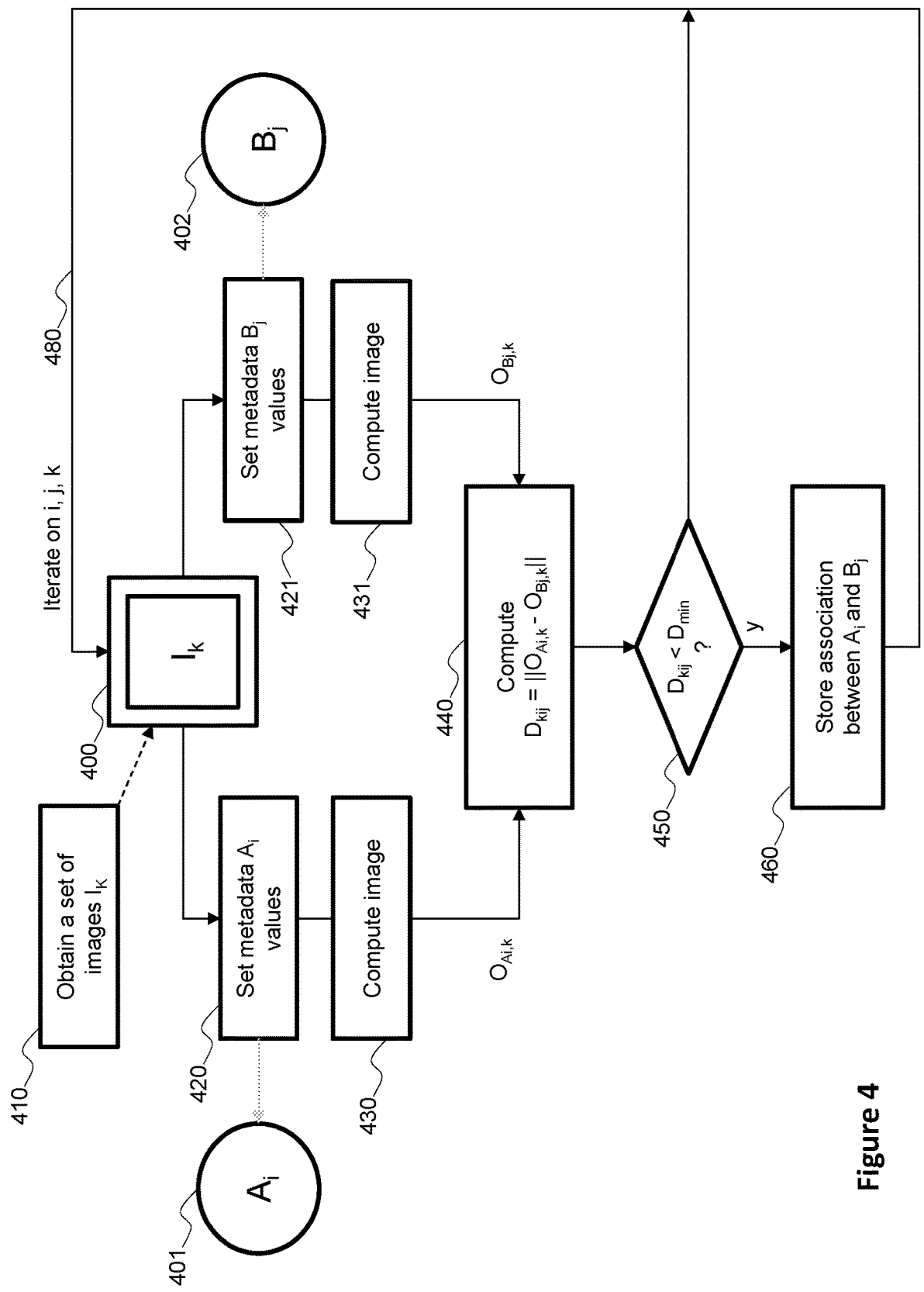
FIG. 4 shows an example of flowchart of a first method of building the lookup table for the metadata translation function in accordance with an embodiment of the present principles.

FIG. 4 show an example of flowchart of the principles of a first method for building the lookup table for the metadata set translation function in accordance with an embodiment of the present principles. Although the different HDR distribution technologies are defined by a set of equations, it may not be straightforward to find analytical solutions to transform the metadata set of first type to metadata set of second type, so that a numerical solution is proposed. Furthermore, such a solution is particularly adapted to low-cost apparatuses since those apparatuses do not include powerful computation capabilities that could handle complex transformation equations.

The proposed method is composed of several stages: firstly, the LUT elements are determined (expansive stage), then the LUT elements are quantized to fit complexity requirements of the targeted apparatus (number of elements/ entries and interpolation methods), and eventually the LUT are directly stored or can be interpolated, according to the capabilities of the targeted or processing apparatus intended to receive and process metadata. Essentially, the process aims at establishing an optimal mapping between a first parameters space and a second (different) parameters space by scanning parameters and gamut space or colour volume space for each input luma/chroma or RGB triplet value (or a subset of possible triplets) and for the considered dynamic range (defined by a peak luminance and a minimum luminance).

First, in step 410, a set of images $I_k$ is obtained. In an embodiment, the set of images $I_k$ is obtained from a library of existing images and selected to cover most situations potentially encountered during normal viewing. As an example, these images comprise memory colors such as flesh or skin tones, blue sky or green grass shades . . . . These images may also comprise dark or bright or saturated content with specular lights and diffuse white. As another example these images are synthetic images comprising set of color values obtained according to content characteristics and allows, for instance, preservation of the color values corresponding to colors representative of flesh tones that may be kept constant all along a sequence of pictures when estimating the translation function. For example, these color values are obtained by taking into account a saliency map obtained from the picture. According to another example, these color values gather color values which are close to each other for the human visual system according to a metric defined in a perceptual uniform color space such as CIELUV or CIELab for example.

In another embodiment, the set of images $I_k$ is obtained by generating exhaustively all variations possible, thus looping over the gamut and the dynamic range. A less exhaustive variant of such embodiment would subsample the whole space to a reduced set, for example by reducing the data resolution (number of bits) used for the generation thus reducing the size of data generated. The building process also uses a set of metadata $A_i$ 401 for the first type and a set of metadata $B_j$ 402 for the second type. In an embodiment, the values of metadata for both sets are explored exhaustively. In another embodiment, the values of metadata for both sets are explored in a subsampled space of possible values. The subsampling for image values and for the metadata values can be non-uniform. For example, if a certain range of pixels values or a certain range of metadata values produces huge differences, the precision to be used in these ranges can be increased to allow a finer approximation.

The process iterates 480 on the images (over the set of images $I_k$), the metadata values for the first type (over the set of metadata $A_i$) and the metadata values for the second type (over the set of metadata $B_j$). For a given iteration involving the image $I_k$, a set of metadata values $A_i$ for first type is selected 420 and a set of metadata values $B_j$ for second type is selected 421. Output images are computed 430, 431 by applying respectively $A_i$ and $B_j$ on the same image $I_k$, thus resulting respectively in images $O_{Ai,k}$ and $O_{Bj,k}$. In step 440, the difference $D_{kij}$ (e.g. Euclidian distance) between both images is then computed. In step 450, the difference $D_{kij}$ is tested for each pair of $A_i$ and $B_j$ by fixing $A_i$, and the minimum difference $D_{min}$ is stored for each given $A_i$ and possibly each given $I_k$. When the pair of $A_i$ and $B_j$ begets $D_{min}$, it is considered that resulting image obtained using a first metadata set of first type matches with the image obtained using a second metadata set of second type and thus the first metadata value of first type is considered to be equivalent to the second metadata value of second type. In other words, for a given image, metadata sets ($A_i$ and $B_j$) are matched when the difference between output images ($O_{Ai,k}$ and $O_{Bj,k}$) is minimal. Possibly, $D_{min}$ should be less than an acceptability threshold in order to confirm the sets of metadata match. Once the matched metadata sets $A_i$ and $B_j$ is determined for one image $I_k$ a final match over the whole set of images is performed (the final matched metadata sets $A_i$ and $B_j$).

In an embodiment, the final matched metadata sets are selected by choosing the matched metadata sets for which the difference $D_{min}$ is minimal over the whole $I_k$ images pool. In an embodiment, the final matched metadata sets are selected by choosing the matched metadata sets that is the most frequently selected over the whole $I_k$ images pool. In an embodiment, the images are categorized (e.g.: dark images with specular light, bright images, saturated images, etc.) and the final matched metadata sets are selected for a image category according to one of the former embodiment.

The association between both metadata values is stored 460 as one element of the LUT. As a result, when the LUT is addressed with the value $A_i$, it returns $B_j$. The iteration stops (not illustrated in the figure) according to a trigger condition. A first example of trigger condition is that enough association have been determined. A second example is when a good coverage of possible input values has been tested. A third example is when all possible combinations have been tested.

In case of synthetic sets of images, those operations are repeated for each considered peak luminance (e.g. 100 cd/m$^2$, 500 cd/m$^2$, 1000 cd/m$^2$, 4000 cd/m$^2$) and possibly considered gamut—BT.2020, P3, BT.709 . . . .

The subset/subsampling of mapping sets ("key" mapping sets) is determined with the number of key mapping sets corresponding to the storage or memory capacities of the targeted apparatus (i.e. the apparatus that will store and implement those mapping sets tables). In other words, to be compatible with apparatuses having low storage capacities, the iterations will be performed on a reduced set of metadata values, exploring the complete range of values with a limited resolution thus resulting to a lookup table of reasonable size (e.g. thousands of kilobytes or few megabytes). With such configuration, the translation may rely on an interpolation mechanism to translate metadata values for the first type to the second type as described earlier.

Figure 5:
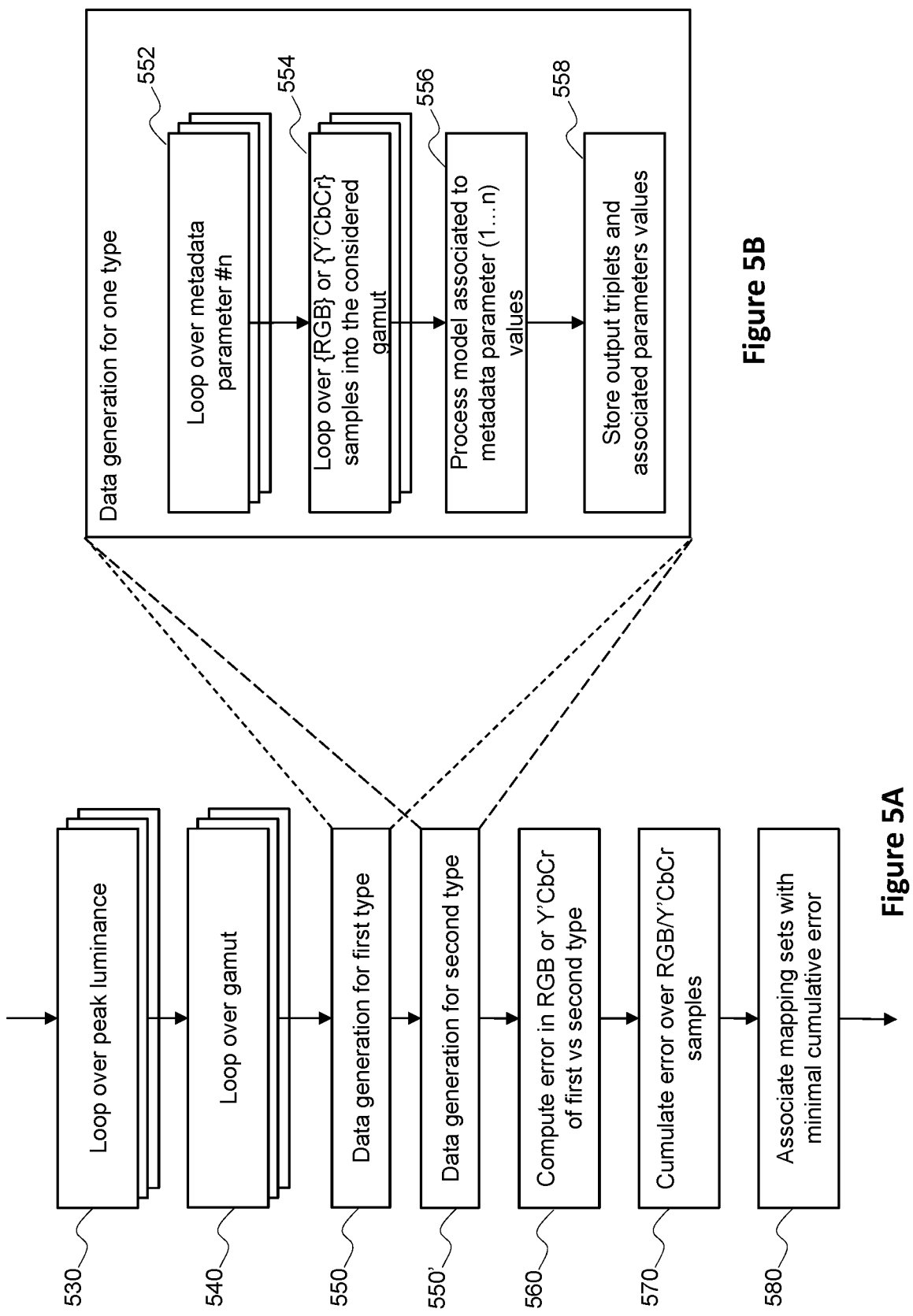
FIGS. 5A and 5B show an example of flowchart of the principles of the first method for building the lookup table for a metadata translation function from DV Polynomial mapping metadata to SL-HDR2 metadata, in accordance with an embodiment of the present principles.

FIGS. 5A and 5B show an example of flowchart of the principles of the first method for building the lookup table for a metadata translation function for instance, from DV Polynomial mapping metadata to SL-HDR2 metadata, in accordance with an embodiment of the present principles. Metadata considered in this document are parameters, beget in a pre-processor and, driving a mapping or a display adaptation process run in a so-called post-processor. These metadata are also referred as dynamic mapping metadata, or dynamic metadata as they can change on a frame-by-frame basis. When not specified otherwise, section references relate to the technical specification ETSI TS 103 433-2 that defines SL-HDR2. In this example, a Y'CbCr or RGB signal is used as input. The goal is to associate values of DV metadata (i.e. DV parameters) to values of SL-HDR2 metadata, for a given gamut and different peak luminances.

First a loop over samples of the considered gamut, and a loop over the different peak luminances considered, is performed. For a given gamut Gam and peak luminance PL (e.g. Gam=BT.2020, PL=4000 cd/m2), the following applies.

The data generation 550 is performed for the DV metadata type as follows. The loop over DV metadata parameters 552 relates to the parameters a1y,b1y,c1y, a1b,b1b,c1b, a1r,b1r, c1r described above (and specified in ST 2094-10 and Annex R of CTA-861-G). For each of these parameters, a set of values are checked. For example, for parameter a1y, values from A1y_init to A1y_end, with a step s1*(A1y_end–

A1y_init), with s1<1 (for example s1=0.1), are scanned. Here, A1y_init to A1y_end are pre-defined limits. The same scanning principle applies to the 8 other parameters. For a given set of DV parameters, $DV_i=(a1y_i,b1y_i,c1y_i, a1b_i,b1b_i, c1b_i, a1r_i,b1r_i,c1r_i)$, resulting from this scanning, i being a scanning index, i=0 to M−1, the following applies:

The normalized linear-light RGB cube is first scanned:
R=0 to 1, with a step s2<1 (for example s2=0.01)
G=0 to 1, with the step s2
B=0 to 1, with the step s2

For each of the (R,G,B) values, noted (Rk,Gk,Bk), k being an index, k=0 to (N−1), the following applies:

A non-linear transfer function is applied. Typically, the ITU-R Rec. BT.2100 PQ (SMPTE ST 2084) inverse EOTF, noted iEOTFPQ is applied to each component, the value of 10000 corresponding to the maximum peak luminance supported by the PQ:

$$R'=\text{iEOTFPQ}(Rk*PL/10000)$$

$$G'=\text{iEOTFPQ}(Gk*PL/10000)$$

$$B'=\text{iEOTFPQ}(Bk*PL/10000)$$

(R',G',B') is converted to (Y',Cb,Cr) using the conversion matrix associated with the gamut Gam. Examples of matrices are given in the table below.

| R'G'B' to Y'UV 2020 | | | R'G'B' to Y'UV 709 | | |
|---|---|---|---|---|---|
| 0.2627 | 0.6780 | 0.0593 | 0.2126 | 0.7152 | 0.0722 |
| −0.1396 | −0.3604 | 0.5000 | −0.1146 | −0.3854 | 0.5000 |
| 0.5000 | −0.4598 | −0.0402 | 0.5000 | −0.4541 | −0.0459 |

The resulting $(Y'_k,Cb_k,Cr_k)$ is converted using the DV parameters as follows:

$$y_{out} = a^i_{1y}\cdot Y'^2_k + b^i_{1y}\cdot Y'_k + c^i_{1y}$$

$$cb_{out} = a^i_{1b}\cdot Cb^2_k + b^i_{1b}\cdot Cb_k + c^i_{1b}$$

$$cr_{out} = a^i_{1r}\cdot Cr^2_k + b^i_{1r}\cdot Cr_k + c^i_{1r}$$

Scaling and clipping may be applied as follows (considering a signal represented on 10 bits):

$$Y\_dv_k=\text{Max}(0,\text{Min}(1023,64+876\cdot y_{out}))$$

$$Cb\_dv_k=\text{Max}(0,\text{Min}(1023,512+896\cdot cb_{out}))$$

$$Cr\_dv_k=\text{Max}(0,\text{Min}(1023,512+896\cdot cr_{out}))$$

The resulting values are stored in a structure Matching_$DV_i$, related to the $i^{th}$ set of DV parameters $DV_i=(a_{1y}{}^i,b_{1y}{}^i,c_{1y}{}^i,a_{1b}{}^i,b_{1b}{}^i,c_{1b}{}^i,a_{1r}{}^i,b_{1r}{}^i,c_{1r}{}^i)$:

Matching_$DV_i(Y'_0,Cb_0,Cr_0)=(Y\_dv_0,Cb\_dv_0,Cr\_dv_0)$

. . . .

Matching_$DV_i(Y'_k,Cb_k,Cr_k)=(Y\_dv_k,Cb\_dv_k,Cr\_dv_k)$

. . . .

Matching_$DV_i(Y'_{N-1},Cb_{N-1},Cr_{N-1})=(Y\_dv_{N-1}, Cb\_dv_{N-1},Cr\_dv_{N-1})$ The loop over SL-HDR2 metadata parameters relates to the LUTs lutMapY, and lutCC mentioned in section 2.1.3.1. The LUTs are typically controlled by a limited set of parameters. Typically, 3 parameters may be used to control lutMapY, noted in this document sl1, sl2, sl3 (respectively shadowGain, HighlightGain and midToneWidthAdjFactor, see clause 6.3.5 of TS 103 433-1). For lutCC, in general, a pre-defined default LUT is used (See clause 6.3.8 of TS 103 433-1). Parameters m0, m1, m2, m3 are also used as metadata (See clause 6.3.2.6 of TS 103 433-1). For each of the parameters sl1, sl2,sl3, m0, m1, m2, m3, a set of values are checked. For example, for parameter sl1, values from $SL1_{1y\_init}$ to $SL1_{1y\_end}$ (range specified in clause 6.3.5 of TS 103 433-1), with a step $S1*(SL1_{y\_end}-SL1_{y\_init})$, with S1<1 (for example s1=0.1), are scanned. Here, $SL1_{y\_init}$ to $SL1_{y\_end}$ are pre-defined limits. The same scanning principle applies for the other parameters.

For a given set of SL-HDR2 parameters, $SLHDR_i=(sl1^i, sl2^i,sl3^i,m0^i,m1^i,m2^i,m3^i)$, resulting from this scanning, i being a scanning index, i=0 to MM−1, the following applies.

The normalized RGB cube is first scanned:
R=0 to 1, with a step s2<1 (for example s2=0.01)
G=0 to 1, with the step s2
B=0 to 1, with the step s2

For each of the (R,G,B) values, noted $(R_k,G_k,B_k)$, k being an index, k=0 to (N−1), the following applies.

A non-linear transfer function is applied. Typically, the BT.2100 PQ inverse EOTF, noted $\text{iEOTF}_{PQ}$ is applied to each component:

$$R'=\text{iEOTF}_{PQ}(R_k*PL/10000)$$

$$G'=\text{iEOTF}_{PQ}(G_k*PL/10000)$$

$$B'=\text{iEOTF}_{PQ}(B_k*PL/10000)$$

(R',G',B') is converted to (Y',Cb,Cr) using the conversion matrix associated with the gamut Gam. The resulting (Y',Cb,Cr) is converted using the SL-HDR2 parameters as follows:

lutMapY is derived from the parameters $SLHDR_i=(sl1^i,sl2^i,sl3^i)$

Center U and V $$U_c=U-2^{B-1}$$

$$V_c=V-2^{B-1}$$

$Y_{post}$ is set to Y
$Y_{post2}$ is derived as $Y_{post2}=\text{Clip3}(0; 2^b-1; Y_{post})$
$U_{post2}$ and $V_{post2}$ are derived as follows, $$\begin{cases} U_{post2} = lutCC\,[Y_{post2}] \times U_{post} \times \text{maxCoeff}/m_3 \\ V_{post2} = lutCC\,[Y_{post2}] \times V_{post} \times \text{maxCoeff}/m_3 \end{cases}$$

where maxCoeff and $m_3$ are specified equation (32) section 7.2.4 of ETSI TS 103 433-2.

The variables $R_1$, $G_1$, $B_1$ are derived as follows, $$\begin{bmatrix} R_1 \\ G_1 \\ B_1 \end{bmatrix} = \begin{bmatrix} 1 & 0 & m_0 \\ 1 & m_1 & m_2 \\ 1 & m_3 & 0 \end{bmatrix} \times \begin{bmatrix} 1 \\ U_{post2} \\ V_{post2} \end{bmatrix}$$

The variables $R_2, G_2, B_2$ are derived from $R_1, G_1, B_1$ as follows, $$\begin{cases} R_2 = lutMapY[Y_{post2}] \times R_1 \\ G_2 = lutMapY[Y_{post2}] \times G_1 \\ B_2 = lutMapY[Y_{post2}] \times B_1 \end{cases}$$

$(R_2, G_2, B_2)$ is converted to $(Y\_sl_k, Cb\_sl_k, Cr\_sl_k)$ using the conversion matrix associated to the gamut Gam.

The resulting values are stored in a structure $Matching\_SLHDR_i$, related to the $i^{th}$ set of SL-HDR2 parameters $SLHDR_i=(sl1^i, sl2^i, sl3^i, m0^i, m1^i, m2^i, m3^i)$:

$Matching\_SLHDR_i(Y'_0, Cb_0, Cr_0)=(Y\_sl_0, Cb\_sl_0, Cr\_sl_0)$

. . . .

$Matching\_SLHDR_i(Y'_k, Cb_k, Cr_k)=(Y\_sl_k, Cb\_sl_k, Cr\_sl_k)$

. . . .

$Matching\_SLHDR_i(Y'_{N-1}, Cb_{N-1}, Cr_{N-1}) = (Y\_sl_{N-1}, Cb\_sl_{N-1}, Cr\_sl_{N-1})$ Then, for each instance of DV parameters, $DVi=(a1yi, b1yi, c1yi, a1bi, b1bi, c1bi, a_{1r}{}^i, b_{1r}{}^i, c_{1r}{}^i)$, i=0 to M-1, the instance of SL-HDR2 providing the best matching is selected as follows:

For j=0 to MM-1, the following applies:
A total distance $D_{ij}$ between the mapped DV and mapped SL-HDR2 signals is computed as follows:

$$D_{ij} = \sum_{k=0}^{N-1} dist((Y\_dv_k, Cb\_dv_k, Cr\_dv_k), (Y\_sl_k, Cb\_sl_k, Cr\_sl_k))$$

where dist( ) is a distance measure between 2 (Y,Cb,Cr) samples.
For example:

$dist((Y_{dv_k}, Cb_{dv_k}, Cr_{dv_k}), (Y_{sl_k}, Cb_{sl_k}, Cr_{sl_k}))=0.8*(Y_{dv_k}-Y_{sl_k})^2+0.1*(Cb\_dv_k-Cb\_sl_k)^2+0.1*(Cr\_dv_k-Cr\_sl_k)^2$ The index j_opt minimizing $D_{ij}$ is identified: $j\_opt=\operatorname{argmin}_j (D_{ij})$ and the parameters $Matching\_SLHDR_{j\_opt}$ are finally associated to the parameters $Matching\_DV_i$.

Figure 6:
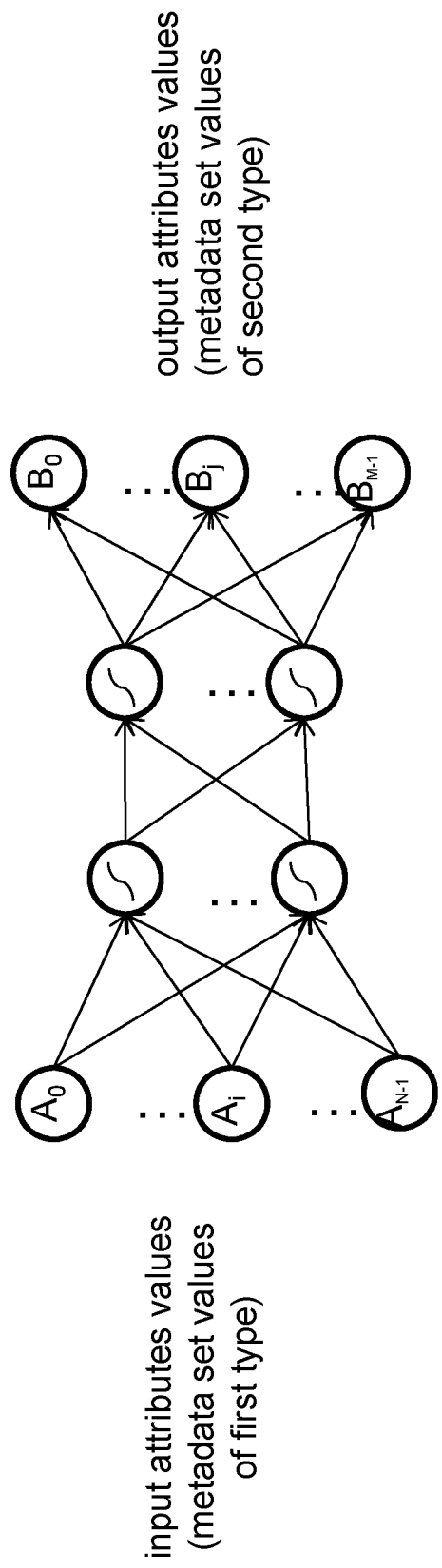
FIG. 6 shows an example of embodiment of a second method of building the lookup table for the metadata translation function in accordance with an embodiment of the present principles.

FIG. 6 shows an example of embodiment of a second method of building the lookup table for the metadata translation function in accordance with an embodiment of the present principles. This method proposes to match a given number of parameters (metadata) sets values driving different processing types i.e. finding the mapping between sets of parameters (metadata) values related to different processing types that output similar output (subject to a minimization criterion) thanks to a neural network.

The parameters of the neural network are defined as follows. Let's define notations:
$I^n$ denotes the n-th image of a set of images used during the learning phase of the neural network training. The whole set of images is denoted $\{I^n\}_{n=1}^N$, with N the total number of images in the set.
$P_A$ denotes the process A, e.g. it may be the Dolby Vision (or HDR10+) post-process described above $P_B$ denotes the process B (which intent is the same as process A however the processing/algorithm is different), e.g. it may be SL-HDR2 post-process described above.

$p_A(I^n)$ denotes the n-th set of parameters/metadata driving process A ($P_A$) and extracted from the analysis of the image $I^n$. Let $\theta_A{}^n$ be specified as $\theta_A{}^n=p_A(I^n)$.

$p_B(I^n)$ denotes the n-th set of parameters/metadata driving process B ($P_B$) and extracted from the analysis of the image $I^n$. Let $\theta_B{}^n$ be specified as $\theta_B{}^n=p_B(I^n)$. $\theta_B{}^n$ is typically a vector of 50 parameters.

$O_A{}^n$ denotes the output images of the n-th input image ($I^n$) of the process A ($P_A$)
The $O_A{}^n$ pictures set is denoted: $\{O_A{}^n=P_A(I^n;\theta_A{}^n)\}_{n=1}^N$ $O_B{}^n$ in denotes the output images of the n-th input image ($I^n$) of the process B ($P_B$)
The $O_B{}^n$ pictures set is denoted: $\{O_B{}^n=P_B(I^n;\theta_B{}^n)\}_{n=1}^N$ $f_w$ denotes the neural network (a function dependent on weights w).

$f_w$ is defined as the function that maps $\theta_A{}^n$ to $\theta_B{}^n$ i.e. the function that converts a determined set of parameters/metadata driving process A to a set of parameters/metadata driving process B.

$\sigma(x)$ denotes the activation function of the neural network $f_w$

Then, the dense neural network is setup typically as follows (with a focus on the training phase):
1 (2 or 3) hidden layers
the number of hidden units (per hidden layer) is strictly inferior to the number of parameters/metadata considered (e.g. less than 10)
input attributes are $\theta_A{}^n$ (e.g. Dolby Vision metadata specified in clause 6.2.1 of ETSI GS CCM 001 v1.1.1). $\theta_A{}^n$ is typically a vector of 50 parameters.
output attributes/predictions are $\theta_B{}^n$ (e.g. SL-HDR metadata specified in clause A.2.2.2 of ETSI TS 103 433-1 v1.2.1). $\theta_B{}^n$ is typically a vector of 50 parameters.
the cost function of the neural network (i.e. optimization criterion) is typically defined as follows:

$$Cost = \min_w \sum_{n=1}^N \|O_A^n - P_B(I^n, f_w(\theta_A^n))\|_2^2$$

N is typically equal to 2000 (number of images for the training set)
The activation function is typically defined as follows:

$\sigma(x)=\max(0,x)$

Thus, when the outputs are similar as determined by the cost function, the input attributes $\theta_A{}^n$ and output attributes $\theta_B{}^n$ are stored in the lookup table, thus establishing the correspondence between the metadata of first type and the metadata of second type.

This embodiment is not limiting and could be extended to other types of processes and associated parameters/metadata, for which a neural network is specialized for a given pair of metadata types.

FIG. 7 illustrates a block diagram of an exemplary system 700 in which various aspects of the exemplary embodiments may be implemented. The system 700 may be embodied as a apparatus including the various components described below and is configured to perform the processes described above. Examples of such apparatuses, include, but are not limited to, personal computers, laptop computers, smartphones, tablet computers, digital multimedia set top boxes, digital television receivers, personal video recording systems, connected home appliances, media servers, broadcast encoders, transcoders, stream processors, asset management apparatuses and media processing apparatuses. The system 700 may be communicatively coupled to other similar systems, and to a display via a communication channel as shown in FIG. 7 and as known by those skilled in the art to implement all or part of the exemplary video systems described above.

Various embodiments of the system 700 include at least one processor 710 configured to execute instructions loaded therein for implementing the various processes as discussed above. The processor 710 may include embedded memory, input output interface, and various other circuitries as known in the art. The system 700 may also include at least one memory 720 (e.g., a volatile memory apparatus, a non-volatile memory apparatus). The system 700 may additionally include a storage apparatus 740, which may include non-volatile memory, including, but not limited to, EEPROM, ROM, PROM, RAM, DRAM, SRAM, flash, magnetic disk drive, and/or optical disk drive. The storage apparatus 740 may comprise an internal storage apparatus, an attached storage apparatus, and/or a network accessible storage apparatus, as non-limiting examples. The system 700 may also include an encoder/decoder module 1630 configured to process data to provide encoded video and/or decoded video, and the encoder/decoder module 730 may include its own processor and memory.

The encoder/decoder module 730 represents the module(s) that may be included in an apparatus to perform the encoding and/or decoding functions. As is known, such an apparatus may include one or both of the encoding and decoding modules. Additionally, the encoder/decoder module 730 may be implemented as a separate element of the system 700 or may be incorporated within one or more processors 710 as a combination of hardware and software as known to those skilled in the art.

Program code to be loaded onto one or more processors 710 to perform the various processes described hereinabove may be stored in the storage apparatus 740 and subsequently loaded onto the memory 720 for execution by the processors 710. In accordance with the exemplary embodiments, one or more of the processor(s) 710, the memory 720, the storage apparatus 740, and the encoder/decoder module 730 may store one or more of the various items during the performance of the processes discussed herein above, including, but not limited to the input video, the decoded video, the bitstream, equations, formulas, matrices, variables, operations, and operational logic.

The system 700 may also include a communication interface 750 that enables communication with other apparatuses via a communication channel 760. The communication interface 750 may include but is not limited to a transceiver configured to transmit and receive data from the communication channel 760. The communication interface 750 may include, but is not limited to, a modem or network card and the communication channel 760 may be implemented within a wired and/or wireless medium. The various components of the system 700 may be connected or communicatively coupled together (not shown in FIG. 7) using various suitable connections, including, but not limited to internal buses, wires, and printed circuit boards.

The exemplary embodiments may be carried out by computer software implemented by the processor 710 or by hardware, or by a combination of hardware and software. As a non-limiting example, the exemplary embodiments may be implemented by one or more integrated circuits. The memory 720 may be of any type appropriate to the technical environment and may be implemented using any appropriate data storage technology, such as optical memory apparatuses, magnetic memory apparatuses, semiconductor-based memory apparatuses, fixed memory, and removable memory, as non-limiting examples. The processor 710 may be of any type appropriate to the technical environment, and may encompass one or more of microprocessors, general purpose computers, special purpose computers, and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing apparatuses in general, including, for example, a computer, a microprocessor, an integrated circuit, or a programmable logic apparatus. Processors also include communication apparatuses, such as, for example, computers, cell phones, portable/personal digital assistants ("PDAs"), and other apparatuses that facilitate communication of information between end-users.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

The person skilled in the art will appreciate that the post-processing function of a receiver apparatus such as the one of FIG. 2A is generally implemented in hardware. The other modules are conventionally software based and can be updated during the lifetime of the receiver (e.g. as a middleware or firmware update). In other words, the metadata translation function can be added to a receiver that was designed for a single HDR technology during its lifecycle. Such operation would allow this receiver to render content according to multiple HDR technologies, for example allowing a SL-HDR2 receiver to render content enhanced with metadata which have been produced for supporting DV HDR technology.

Furthermore, although the different alternate embodiments have been described separately, they can be combined together in any form.

In a first variant embodiment of first aspect, the translation is done by using a lookup table determined according to a difference between a test image reconstructed using the first metadata set and the same image reconstructed using the second metadata set and wherein the lookup table stores at least one association between metadata set values for first type and a metadata set values for second type.

In a variant embodiment of first aspect, the lookup table is determined by iterating over a set of images, over values for a metadata set of first type and over values for a metadata set of second type; selecting an image $I_k$, a metadata set value $A_i$ for first type and a metadata set value $B_j$ for second type; computing a first image $O_{Ai,k}$ by applying metadata set value $A_i$ on the image $I_k$; computing a second image $O_{Bj,k}$ by applying metadata set value B on the image $I_k$; when the difference $D_{kij}$ between $O_{Ai,k}$ and $O_{Bj,k}$ is smaller than a determined value, store in the lookup table the association between the metadata set value $A_i$ for first type and the metadata set value $B_j$ for second type.

In a variant embodiment of first aspect, the lookup table is determined by using a neural network to find a mapping between input metadata set values for first type and output metadata set values for second type that delivers similar output according to a cost function and store said mapping in said lookup table.

In an example embodiment, translating the value of the first metadata set further comprises an approximation in the case where no direct association exists in the lookup table and wherein the approximation is done by: selecting an entry of the lookup table whose distance with the first metadata values is the smallest and providing as result the transformed second metadata corresponding to the selected entry.

In an example embodiment, translating the value of the first metadata set further comprises an approximation in the case where no direct association exists in the lookup table for the value of the first metadata set and wherein the approximation is done when the value of the metadata to translate is in-between the values of two entries of the lookup table, the approximation being done by determining an interpolation of the value of the first metadata set to translate between the closest entries of values of first metadata set in the LUT and applying the same interpolation to the output of the closest entries.

In an example embodiment, translating the value of the first metadata set further comprises an approximation in the case where no direct association exists in the lookup table for the value of the first metadata set and wherein, a default metadata value is provided for the output when the distance between the value of the metadata to translate and any entry of the LUT is greater than a determined value.

In an example embodiment, the method further comprises obtaining default metadata according to a second type of high dynamic range video in the case where no lookup table entry corresponds to the first type of high dynamic range video.

In an example embodiment, the method further comprising bypassing the metadata translation in the case where the first type of high dynamic range video is the same as the second type of high dynamic range video.

The invention claimed is:

1. A method for translating metadata related to high dynamic range video, the method comprising:
   obtaining a value of a first metadata set corresponding to a first type of high dynamic range video; and
   translating the value of the first metadata set into a value of a second metadata set corresponding to a second type of high dynamic range video using an association between one or more metadata values for the first type of high dynamic range video and one or more metadata values for the second type of high dynamic range video;
   wherein the translation is done by using a lookup table determined according to a difference between a test image reconstructed using the first metadata set and the same image reconstructed using the second metadata set and wherein the lookup table stores at least one association between one or more metadata values for the first type and one or more metadata values for the second type.

2. The method of claim 1, further comprising determining the lookup table by:
   iterating over a set of images, over values for the first metadata set of the first type, and over values for the second metadata set of the second type;
   selecting an image $I_k$, a metadata set value $A_i$ for the first type, and a metadata set value $B_j$ for the second type;
   computing a first image $O_{Ai,k}$ by applying metadata set value $A_i$ on the image $I_k$;
   computing a second image $O_{BJ,k}$ by applying metadata set value $B_j$ on the image $I_k$;
   when the difference $D_{kij}$ between $O_{Ai,k}$ and $O_{BJ,k}$ is smaller than a determined value, store in the lookup table the association between the metadata set value $A_i$ for the first type and the metadata set value $B_j$ for the second type.

3. The method of claim 1, further comprising building the lookup table by using a neural network to find a mapping between input metadata set values for the first type and output metadata set values for the second type that delivers similar output according to a cost function and store said mapping in said lookup table.

4. The method of claim 1, wherein translating the value of the first metadata set further comprises an approximation in the case where no direct association exists in the lookup table and wherein the approximation is done by:
   selecting an entry of the lookup table whose distance from one or more metadata values for the first type is the smallest; and
   providing as result the transformed second metadata corresponding to the selected entry.

5. The method of claim 1, wherein translating the value of the first metadata further comprises an approximation in the case where no direct association exists in the lookup table for the value of the first metadata set and wherein the approximation is done when the value of the metadata to translate is in between the values of two entries of the lookup table, the approximation being done by determining an interpolation of the value of the first metadata set to translate between the closest entries of values of the first metadata set in the lookup table and applying the same interpolation to the output of the closest entries.

6. The method of claim 1, wherein translating the value of the first metadata set further comprises an approximation in the case where no association exists for the value of the first metadata set and wherein a default metadata value is provided for the output when the distance between one or more metadata values for the first type to translate and any entry of the lookup table is greater than a determined value.

7. The method of claim 1, further comprising obtaining default metadata according to the second type of high dynamic range video in the case where no association exits for the value of the first metadata set.

8. The method of claim 1, further comprising bypassing the metadata translation in the case where the first type of high dynamic range video is the same as the second type of high dynamic range video.

9. A receiver apparatus comprising a processor configured to:
obtain a bitstream comprising a high dynamic range video of a first type of high dynamic range video,
render high dynamic range video of a second type;
parse metadata of the first type;
obtain a value of a first metadata set corresponding to the first type of high dynamic range video; and
translate the value of the first metadata set into a value of a second metadata set corresponding to a second type of high dynamic range video using an association between one or more metadata values for the first type of high dynamic range video and one or more metadata values for the second type of high dynamic range video;
wherein the translation is done by using a lookup table determined according to a difference between a test image reconstructed using the first metadata set and the same image reconstructed using the second metadata set and wherein the lookup table stores at least one association between one or more metadata values for the first type and one or more metadata values for the second type.

10. A transmitter apparatus comprising a processor configured to:
obtain a bitstream comprising a high dynamic range video of a first type,
parse metadata of the first type;
obtain a value of a first metadata set corresponding to the first type of high dynamic range video;
translate the value of the first metadata set into a value of a second metadata set corresponding to a second type of high dynamic range video using an association between one or more metadata values for the first type of high dynamic range video and one more metadata values for the second type of high dynamic range video;
replace the value of the first metadata set of first type in the bitstream by the translated metadata value for the second type; and
provide the high dynamic range video of the second type;
wherein the translation is done by using a lookup table determined according to a difference between a test image reconstructed using the first metadata set and the same image reconstructed using the second metadata set and wherein the lookup table stores at least one association between one or more metadata values for the first type and one or more metadata values for the second type.

11. A non-transitory computer-readable medium comprising instructions which when executed by a computer, cause the computer to translate metadata related to high dynamic range video, comprising:
obtaining a value of a first metadata set corresponding to a first type of high dynamic range video; and
translating the value of the first metadata set into a value of a second metadata set corresponding to a second type of high dynamic range video using an association between one or more metadata values for the first type of high dynamic range video and one or more metadata values for the second type of high dynamic range video;
wherein the translation is done by using a lookup table determined according to a difference between a test image reconstructed using the first metadata set and the same image reconstructed using the second metadata set and wherein the lookup table stores at least one association between one or more metadata values for the first type and one or more metadata values for the second type.

12. The receiver apparatus of claim 9, wherein translation of the value of the first metadata set further comprises an approximation in the case where no direct association exists in the lookup table and wherein the approximation is done by the processor further configured to:
select an entry of the lookup table whose distance from one or more metadata values for the first type is the smallest; and
provide as result the transformed second metadata corresponding to the selected entry.

13. The receiver apparatus of claim 9, wherein translation of the value of the first metadata further comprises an approximation in the case where no direct association exists in the lookup table for the value of the first metadata set and wherein the approximation is done when the value of the metadata to translate is in between the values of two entries of the lookup table, wherein the approximation is done by the processor further configured to determine an interpolation of the value of the first metadata set to translate between the closest entries of values of the first metadata set in the lookup table and apply the same interpolation to the output of the closest entries.

14. The receiver apparatus of claim 9, wherein translation of the value of the first metadata set further comprises an approximation in the case where no association exists for the value of the first metadata set and wherein a default metadata value is provided for the output when the distance between one or more metadata values for the first type to translate and any entry of the lookup table is greater than a determined value.

15. The receiver apparatus of claim 9, wherein the processor is further configured to obtain default metadata according to the second type of high dynamic range video in the case where no association exits for the value of the first metadata set.

16. The receiver apparatus of claim 9, wherein the processor is further configured to bypass the metadata translation in the case where the first type of high dynamic range video is the same as the second type of high dynamic range video.

17. The transmitter apparatus of claim 10, wherein translation of the value of the first metadata set further comprises an approximation in the case where no direct association exists in the lookup table and wherein the approximation is done by the processor further configured to:

select an entry of the lookup table whose distance from one or more metadata values for the first type is the smallest; and provide as result the transformed second metadata corresponding to the selected entry.

18. The transmitter apparatus of claim 10, wherein translation of the value of the first metadata further comprises an approximation in the case where no direct association exists in the lookup table for the value of the first metadata set and wherein the approximation is done when the value of the metadata to translate is in between the values of two entries of the lookup table, wherein the approximation is done by the processor further configured to determine an interpolation of the value of the first metadata set to translate between the closest entries of values of the first metadata set in the lookup table and apply the same interpolation to the output of the closest entries.

* * * * *